(12) United States Patent
Schmitt

(10) Patent No.: US 7,398,847 B2
(45) Date of Patent: Jul. 15, 2008

(54) RADIATOR ARRANGEMENT

(75) Inventor: Harald Schmitt, Homburg (DE)

(73) Assignee: Deere & Company, Moline, IL (US)

( * ) Notice: Subject to any disclaimer, the term of this patent is extended or adjusted under 35 U.S.C. 154(b) by 138 days.

(21) Appl. No.: 11/395,814

(22) Filed: Mar. 31, 2006

(65) Prior Publication Data

US 2006/0219451 A1     Oct. 5, 2006

(30) Foreign Application Priority Data

Mar. 31, 2005   (DE)  ..................... 10 2005 014 614

(51) Int. Cl.
*B60K 11/04* (2006.01)
(52) U.S. Cl. ..................... 180/68.4; 248/232
(58) Field of Classification Search ............... 180/68.4, 180/232, 312; 165/67, 121, 149; 248/232, 248/209, 213.3, 233
See application file for complete search history.

(56) References Cited

U.S. PATENT DOCUMENTS

| | | | | |
|---|---|---|---|---|
| 3,334,704 A | * | 8/1967 | Gehrke et al. | 180/68.4 |
| 4,541,645 A | * | 9/1985 | Foeldesi | 180/68.4 |
| 6,059,019 A | * | 5/2000 | Brost et al. | 165/67 |
| 6,318,450 B1 | * | 11/2001 | Acre | 165/67 |
| 6,412,581 B2 | * | 7/2002 | Enomoto et al. | 180/68.4 |
| 6,571,898 B2 | * | 6/2003 | Guyomard | 180/68.4 |
| 6,668,956 B1 | * | 12/2003 | Pelage et al. | 180/68.4 |
| 6,742,615 B2 | * | 6/2004 | Cristante et al. | 180/68.4 |
| 7,036,617 B2 | * | 5/2006 | Harada | 180/68.4 |
| 7,246,674 B2 | * | 7/2007 | Andritter et al. | 180/68.4 |

* cited by examiner

*Primary Examiner*—Hau V Phan

(57) ABSTRACT

A radiator arrangement is provided for a work vehicle. The radiator arrangement includes a radiator and a guiding axle that is seated in a first guide element. In order to provide a cleaning position of the radiator with improved accessibility for maintenance purposes, the radiator arrangement is configured such that the guiding axle is radially displaceable relative to the first guide element in a guideway of the first guide element. This allows the radiator to be moved from an operating position to a cleaning position by displacing the guiding axle relative to the first guide element in a direction that is generally radial to the guiding axle.

14 Claims, 3 Drawing Sheets ature, the radiator becomes dirty and lose efficiency, mak-
RADIATOR ARRANGEMENT

BACKGROUND

1. Field of the Invention

The invention relates to a radiator arrangement for a work vehicle, including at least one radiator or condenser configured to facilitate access for cleaning.

2. Description of Related Art

Agricultural work vehicles, in particular towing tractors or wheeled loaders such as telescopic loaders, today include increasingly high-tech and powerful refrigeration units. The provision of powerful refrigeration units requires increased cooling capacity. Tight installation conditions, in particular in the region of the engine compartment, also necessitate a compact design. In order to be able to provide a high level of cooling capacity and a compact design, radiator arrangements are frequently arranged in a modular design, in which several individual radiators or condensers are disposed closely together in rows. As referred to above and below, the term radiator refers to any conventional radiators, condensers or similar heat exchange devices.

Due to the rough work environment of agricultural work vehicles, the radiators become dirty and lose efficiency, making it necessary to clean them at regular intervals. In order to clean radiators arranged in modules, the individual radiators have to be exposed to enable access to any covered surfaces of the radiators. In work vehicles where this activity has to be performed frequently, the use of various swivel devices for the individual radiators is common. Radiator arrangements therefore typically comprise one or more pivot axles, about which the individual radiators can pivot. This solution requires a relatively large pivot angle to ensure easy access to the covered surfaces of the radiators. The relatively large pivoting angle in turn necessitates that the pivoting vehicle radiators are not obstructed by other components in the engine compartment, or that such other components may first have to be removed. Yet, even with a relatively large pivoting angle, access in the area of the swivel axis is frequently very limited. In order to facilitate relatively large pivot angles for the radiators, it is necessary to route connecting lines accordingly, leading to complex and costly designs.

It is therefore the object of the invention to provide a radiator arrangement of the kind described above which overcomes the disadvantages associated with existing radiator arrangements.

SUMMARY

According to the present invention, a radiator arrangement is provided with a guiding axle radially displaceable relative to a first guide element in a guideway. A radiator can be moved from an operating position to a cleaning position by displacing the guiding axle relative to the first guide element. By displacing the swivel axis radially to the guiding axle about a path that is specified by the guideway, an open space is created, which allows easy access for cleaning and maintenance between surfaces of opposed radiators as well as other components in the engine compartment. The displacement of the swivel axis allows the entire radiator to be moved away from an adjacent radiator or other components in the engine compartment. Compared to existing solutions, this offers the advantage that pivoting about the guiding axle with relatively large pivoting angles is not required to grant access to the covered surfaces.

Regardless of where they are connected to the radiator, hoses, lines, tubes and the like mounted to the radiator only have to be routed short distances and require only slightly more length. This is advantageous in tight and compact installation conditions, for example, when several radiators or other vehicle components are combined. As a result, this reduces the cost of the radiator arrangement.

In an additional embodiment, the radiator is mounted pivotably about the guiding axle so that a pivoting motion of the radiator about the swivel axis can be added to provide an even more convenient cleaning position of the radiator. This requires only a small pivot angle to allow access to the covered surfaces of the radiators. The radiator can then be moved from the operating position to the cleaning position by displacing the guiding axle and by a pivoting motion about the guiding axle.

The radiator arrangement can also be provided with a support element, to which both the radiator and other components are mounted. It is conceivable to configure the support element as a fastening frame or to use individual stationary parts or other components of the radiator arrangement as support elements. The components do not have to be mounted on the fastening frame, but can be connected to each other in a kind of modular design, in which the individual fastened components together form a supporting frame, without utilizing the fastening frame. The first guide element for example can be fastened directly to an engine block functioning as a support element or to another component in the engine compartment.

In a preferred embodiment, the first guide element is fastened to the support element, wherein the first guide element may also be fastened to another component in the modular design. In this embodiment, the guiding axle is fastened to the radiator so that the guiding axle together with the radiator can be displaced radially relative to the first guide element.

In an alternative example, the guiding axle is fastened to the support element, for example, to a fastening frame. The first guide element is then attached to the radiator so that the guiding axle can be displaced radially relative to the first guide element together with the radiator. Here as well, the guiding axle may be fastened to other support elements or components instead of to a fastening frame.

The guideway configured in the first guide element includes at least one indentation, in which the guiding axle can engage. The indentation may represent an impression, in which the guiding axle is conducted and fixed through contact with it, wherein the indentation or impression can be provided in the guideway substantially upward or downward depending on the arrangement of the guiding axle and the first guide element. When displacing the guiding axle together with the radiator relative to the first guide element, the indentation should be downward so that the guiding axle rests in the indentation as a result of the weight of the radiator. Of course other solutions are also conceivable which allow the guiding axle to be fixed in the guideway. For example it may be fixed by means of interlocking teeth, threads or a tight fit between the first guide element and the guiding axle.

In the preferred embodiment of the invention, the guideway includes first and second indentations at opposing ends of the guideway. These indentations define the final position of the guiding axle in the guideway, and the indentations securely restrain the radiator in either the operating or cleaning positions. Should the radiator arrangement according to the present invention be configured such that the first guide element can be displaced together with the radiator, it is suitable to configure the indentations upward so that the guiding axle can engage or lock in the guideway as a result of the weight of the radiator.

In another embodiment, a retaining bolt is provided mounted displaceably along a guideway configured in a second guide element. The retaining bolt serves to support the radiator in order to limit a swiveling motion or displacement of the radiator and to additionally support the radiator. The fact that the retaining bolt is guided in a guideway of the second guide element limits the pivoting angle to which the radiator can pivot and holds the radiator when in the cleaning position.

The second guide element is preferably mounted pivotably so that it is possible to lower or fold in the second guide element in the operating position of the radiator.

The guideway can likewise be provided with one or more indentations, in which the retaining bolt can engage or rest. This way the radiator can be locked or fixed or engaged in the cleaning position or operating position, similarly as set forth above.

The arrangement of the second guide element and the retaining bolt can be implemented in various ways, as already explained in the description of the arrangement of the first guide element and the guiding axle. For example, the second guide element can be fastened to a stationary part, such as another support element or another component of the radiator arrangement, and the retaining bolt can be fastened to the radiator or also vice versa.

In order to secure the pivoting second guide element, a fastening means is provided, which attaches a pivoting end of the second guide element to the support element on the radiator. Such fastening can be achieved, for example, by means of a screw, bolt or a tensioning device. The radiator is pivoted into the cleaning position by folding out the second guide element so that the radiator is held in the cleaning position. By fastening the second guide element to prevent pivoting, this also prevents the radiator from moving.

Additionally, the radiator can also be secured against moving by providing a fastening means between the radiator and support element. This may be implemented, by a tab detachably connected to the radiator and the support element. Such a connection may be provided, for example, by means of a screw, bolt, or a tensioning device.

In another embodiment of the invention, the radiator arrangement includes a plurality of radiators, which are arranged in rows, wherein at least a first radiator at least partially covers a second radiator in the operating position. It is also conceivable to have other components in the engine compartment provided with the above-mentioned guide elements and guiding axles in order to enable other components in the engine compartment to be displaced or pivoted in a cleaning position in a similar fashion. A radiator arrangement for example may be also comprise two or more radiators, which comprise such guide elements and guiding axles.

Radiator arrangements are preferably used in work vehicles, in particular in agricultural work vehicles, such as towing tractors, wheeled loaders or harvesters. It is, however, also conceivable to use radiator arrangements in other work vehicles, for example in forestry equipment or in construction equipment.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The invention as well as further advantages and advantageous developments and embodiments will be described and explained in more detail hereinafter with reference to the embodiment that is schematically illustrated in the figures, wherein.

DETAILED DESCRIPTION

Figure 1:
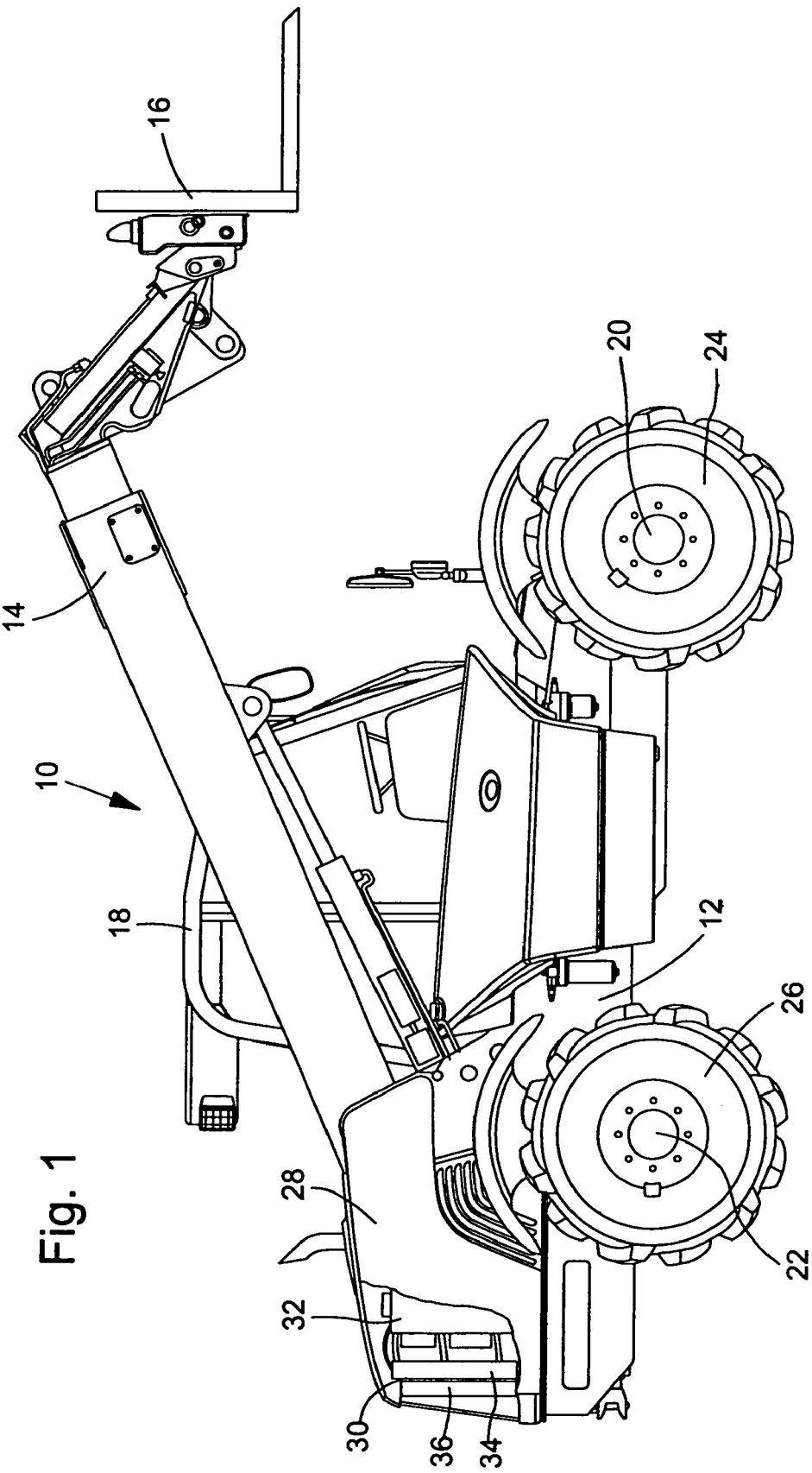
FIG. 1 is a side view of a work vehicle including a radiator arrangement according to the present invention.

FIG. 1 shows a work vehicle 10 in the form of a telescopic loader. The work vehicle 10 comprises a chassis 12, a boom 14 to which a tool 16 is connected, a cabin 18, and front and rear axles 20, 22 including wheels 24, 26. The work vehicle 10 furthermore comprises an engine compartment 28, including an engine 32, and other components (not shown) required for the operation of the work vehicle 10. Within the engine compartment 28, a radiator arrangement 30, configured according to the present invention, is connected to and supported by the chassis 12 of the work vehicle 10.

Figure 2:
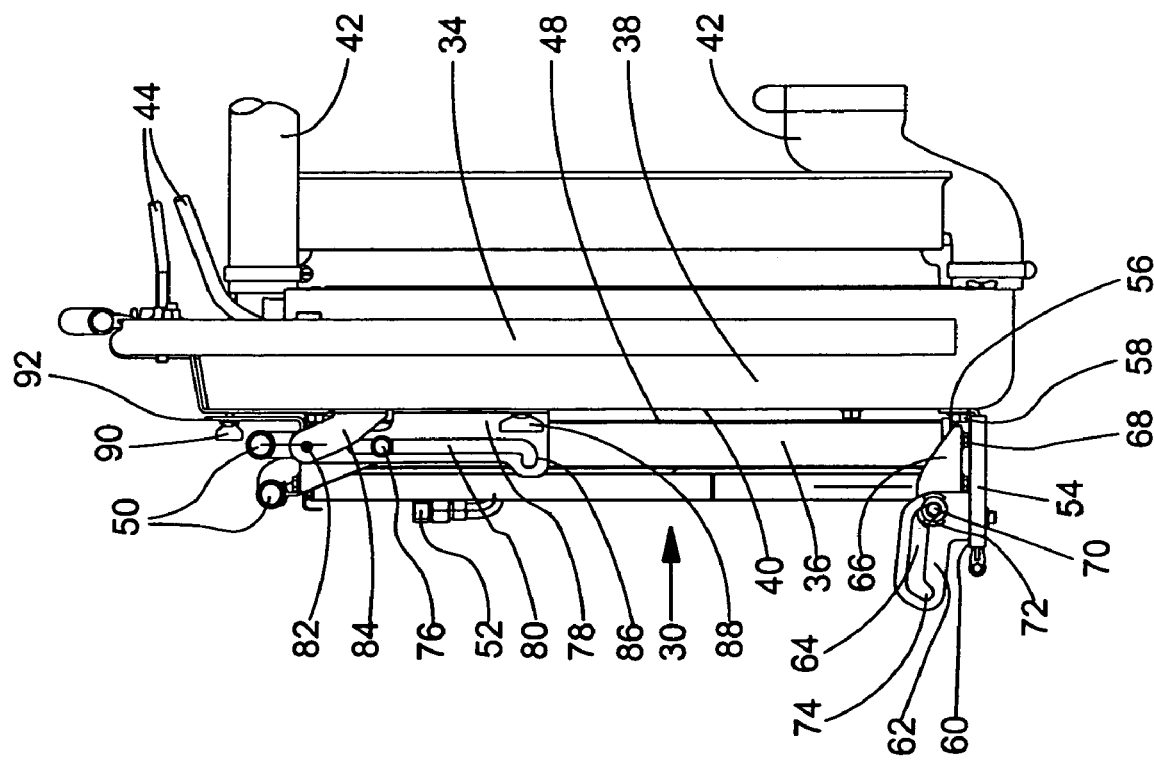
FIG. 2 is a side view of a radiator arrangement according to the present invention in an operating position.
Figure 3:
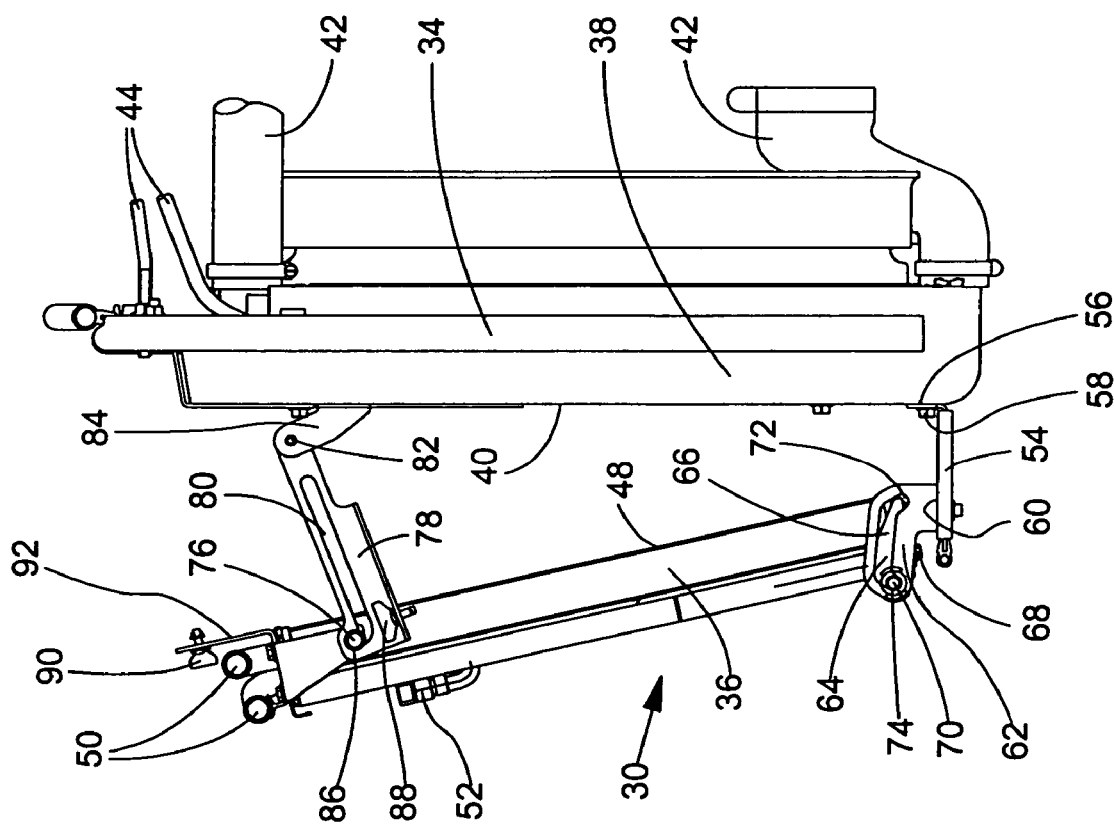
FIG. 3 is a side view of a radiator arrangement according to the present invention in a cleaning position.

FIGS. 2 and 3 more clearly show the radiator arrangement 30 with FIG. 2 illustrating the radiator arrangement 30 in an operating position. The radiator arrangement 30 includes a base module 38, a first radiator 34 and a second radiator 36. The first radiator 34 and the second radiator 36 are arranged in rows in a single module. As mentioned previously, the term radiator refers to any conventional radiator, condenser, or similar heat exchange device.

The first radiator 34 includes a first cooling surface 40 facing the second radiator 36. The second radiator 36 includes a second cooling surface 48 facing the first radiator 34. The second radiator 36 is also connected to air conditioning units (not shown) or the engine 32 of the work vehicle 10, by means of hoses 50 and connecting lines 52.

The first and second radiators 34, 36 are mutually connected by means of a support element 54. The support element 54 is configured as a rectangular piece of sheet metal, which extends cross the entire width of the second radiator 36 and is mounted to the first radiator surface 40 on a vertical lateral surface 56 by means of, fasteners, for example, screws 58. A first guide element 62 is coupled to a horizontal lateral surface 60 of the support element 54. The first guide element 62 is configured as a sheet metal tab which includes a guideway 64. The first guide element 62 and the support element 54 may be located on either side or both sides of the second radiator 36.

The second radiator 36 also includes a connecting piece 66 coupled to the bottom and side of the second radiator 36 by means of screws 68 or other fastening means. A guiding axle 70 extends from the connecting piece 66 which is firmly connected to the second radiator 36. The connecting piece 66 therefore serves to couple the guiding axle 70 to the second radiator 36. The connecting piece 66 is included on both sides of the second radiator 36. The guiding axle 70 may be configured as a guide pin, mounted to the connecting piece 66 in an outward direction, or as a continuous axle, extending across the entire width of the second radiator 36, and through the connecting pieces 66 on either side.

The guiding axle 70 extends on either side of the second radiator 36 through the guideway 64 of the first guide element 62. This permits the second radiator 36 to be displaced or moved along the guideway 64 and includes pivot about the guiding axle 70. The guideway 64 includes first and second indentations 72, 74 at either end extending substantially downward. The guiding axle 70 engages the indentations 72, 74 by the weight of the second radiator 36. This places the guiding axle 20 into one of two restrained positions associated with the first and second indentations 72, 47.

In the position illustrated in FIG. 2, the guiding axle 70 and the second radiator 36 are in an operating position (i.e. the position in which the radiator arrangement 30 functions during operation of the work vehicle 10). In the operating position shown, the guiding axle 70 is disposed in the first indentation 72. Should the radiator arrangement 30 need cleaning position for maintenance purposes, the second radiator 36 can be moved into a cleaning position by lifting the guiding axle 70 out of the first indentation 72, moving the guiding axle 70 along the guideway 64, relative to the first guide element 62, and lowering the guiding axle 70 into the second indentation 74 (see FIG. 3).

Additionally, the second radiator 36 can be pivoted about the guiding axle 70, forming an opening angle between the second radiator 36 and the first radiator 34. The opening angle may be adjusted, further increasing the accessibility of the radiator surfaces 40, 48. The angle of the second radiator 36 is limited by a lateral retaining bolt 76 connected to the second radiator 36 and configured to engage a second guide element 78.

The second guide element 78 is configured, for example, as a sheet-metal arm, which includes a guideway 80, in which the retaining bolt 76 may move. The second guide element 78 is connected at one end by means of a pivot connection 82 to a retaining piece 84 mounted to the first radiator surface 40. On the opposite end of the second guide element 78 an upwardly extending indentation 86 is provided in the guideway 80. The indentation 86 is a restraining feature similar to the indentations 72, 74 of the first guide element 62. By pivoting the second radiator 36, the retaining bolt 76 is moved along the guideway 80 of the second guide element 78. The weight of the second radiator 36 moves it downward, so that the retaining bolt 76 reaches the indentation 86 and locks the second radiator 36 in the cleaning position.

To release and pivot the second radiator 36 back into the operating position, the second guide element 78 only requires slight lifting to move the retaining bolt 76 from the indentation 86 in the guideway 80. When the second radiator 36 is pivoted into the operating position, the retaining bolt 76 pushes the second guide element 78 around the pivot connection 82 toward a vertical position. Displacing the guiding axle 70 from the second indentation 74 (cleaning position, see FIG. 3) into the first indentation 72 (operating position, see FIG. 2), the second guide element 78 is returned to its starting position in a vertical orientation parallel to the first radiator surface 40 (see FIG. 2).

To prevent unwanted movement of the second radiator 36, which may result, for example, from vibrations or sudden accelerations of the work vehicle 10, the second guide element 78 is provided with a first fastener 88 usually in the form of quick-release device. The first fastener 88 is designed such that the second guide element 78 resting on the first radiator surface 40 is connected detachably to the first radiator 34, fastening it in its starting position (i.e. vertically, see FIG. 2). By fastening the second guide element 78 in its starting position, the second guide element 78 cannot pivot, and as a consequence the retaining bolt 76 cannot be displaced along the guideway 80. The radiator arrangement 30 is additionally secured with a second fastener 90. The second fastener 90 is likewise designed as a quick-release device and detachably connects a retaining piece 92 fastened to the top of the second radiator 36, to the first radiator surface 40 of the first radiator 34. The radiator arrangement 30 or the second radiator 36 can only be moved from the operating position in the cleaning position when both fasteners 88, 90 have been released.

While the present invention has been described solely based on one embodiment, many varied alternatives, modifications and variations that are covered by the invention will become apparent to a person skilled in the art from the above specification, as well as the drawings. For example, the second guide element 78 can be designed as a stationary, non-pivoting guide element comprising a circular arc-like guideway. Additionally, the support element 54 can be configured not as a single part, but instead as part of a fastening frame, which supports the entire radiator arrangement 30 or only the first or second radiator.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A radiator arrangement for a work vehicle, comprising: at least one radiator and a guiding axle that is seated in a first guide element, the guiding axle being radially displaceable relative to the first guide element along a guideway within the first guide element such that the radiator is moveable from an operating position to a cleaning position by displacing the guiding axle relative to the first guide element in a direction generally radial to the guiding axle wherein the radiator is mounted pivotably about the guiding axle and can be moved from the operating positing to the cleaning position by both pivoting it about the guiding axle and displacing it along the guideway.

2. A radiator arrangement according to claim 1, further comprising a support element.

3. A radiator arrangement according to claim 2, wherein the first guide element is secured to the support element and the guiding axle is secured to the radiator.

4. A radiator arrangement according to claim 2, wherein the guiding axle is secured to the support element and the first guide element is secured to the radiator.

5. A radiator arrangement according to claim 1, wherein the guideway includes at least one indentation that the guiding axle can engage.

6. A radiator arrangement according to claim 5, wherein the guideway includes first and second indentations arranged at opposing ends of the guideway.

7. A radiator arrangement according to claim 1, further comprising a retaining bolt displaceably mounted within a second guideway provided within a second guide element.

8. A radiator arrangement according to claim 7, wherein the second guide element is pivotably mounted.

9. A radiator arrangement according to claim 7, wherein the guideway of the second guide element includes a second indentation that the retaining bolt can engage.

10. A radiator arrangement according to claim 7, wherein the second guide element is attached to a stationary part and the retaining bolt is attached to the radiator.

11. A radiator arrangement according to claim 7, wherein the second guide element is attached to the radiator and the retaining bolt is attached to a stationary part.

12. A radiator arrangement according to claim 7, wherein the second guide element is fastened to prevent pivoting by means of a first fastener.

13. A radiator arrangement according to claim 1, wherein the radiator can be fixed to prevent pivoting by means of a second fastener.

14. A radiator arrangement according to claim 1, wherein a first and second radiator are provided, the first and second radiators being arranged in rows with the first radiator at least partially covering the second radiator in the operating position.

* * * * *